(12) United States Patent
Hemmingsen

(10) Patent No.: US 7,878,524 B1
(45) Date of Patent: Feb. 1, 2011

(54) GOOSENECK TRAILER HITCH CONVERTIBLE TO A LIFTING BOOM

(76) Inventor: Craig Robert Hemmingsen, 11074 Diamond Ave., Akron, IA (US) 51001

( * ) Notice: Subject to any disclaimer, the term of this patent is extended or adjusted under 35 U.S.C. 154(b) by 114 days.

(21) Appl. No.: 12/414,367

(22) Filed: Mar. 30, 2009

(51) Int. Cl.
*B62D 53/06* (2006.01)
(52) U.S. Cl. .............. 280/415.1; 280/417.1; 280/416.1; 414/462
(58) Field of Classification Search ............. 280/415.1, 280/416.1, 416.2, 417.1, 425.2, 441.2, 476.1; 414/703, 912, 920, 462, 685, 686, 930; 224/484, 224/486
See application file for complete search history.

(56) References Cited

U.S. PATENT DOCUMENTS

| | | | | |
|---|---|---|---|---|
| 2,804,979 | A * | 9/1957 | Lassiter | 212/301 |
| 3,796,443 | A | 3/1974 | Crutchfield | |
| 3,800,966 | A * | 4/1974 | Newton | 414/550 |
| 3,840,252 | A | 10/1974 | Jocoy | |
| 4,433,853 | A | 2/1984 | Swaim | |
| 4,459,075 | A * | 7/1984 | Eichenberger | 414/24.5 |
| 4,832,358 | A | 5/1989 | Bull | |
| 5,167,190 | A | 12/1992 | Galand | |
| 5,324,061 | A | 6/1994 | Lay | |
| 5,490,755 | A * | 2/1996 | Billotte | 414/550 |
| 5,797,614 | A * | 8/1998 | Hord et al. | 280/417.1 |
| 5,960,662 | A * | 10/1999 | Morello | 72/166 |
| 6,152,675 | A * | 11/2000 | Compton | 414/543 |
| 6,361,062 | B1 * | 3/2002 | Edin et al. | 280/416.2 |
| 6,474,673 | B1 * | 11/2002 | Biggins | 280/417.1 |
| 6,821,075 | B2 | 11/2004 | van der Horn | |
| 7,029,019 | B1 * | 4/2006 | Dye | 280/416.2 |
| 7,111,862 | B1 * | 9/2006 | Eng | 280/438.1 |
| 2003/0007855 | A1 | 1/2003 | van der Horn | |
| 2004/0234367 | A1 | 11/2004 | Pacini | |
| 2006/0027997 | A1 | 2/2006 | Grace | |

* cited by examiner

*Primary Examiner*—Lesley Morris
*Assistant Examiner*—Tashiana Adams
(74) *Attorney, Agent, or Firm*—Jeffrey A. Proehl; Woods, Fuller, Shultz & Smith PC

(57) ABSTRACT

A gooseneck trailer hitch assembly convertible to a lifting boom is disclosed. The gooseneck assembly is convertible between a tow configuration and a boom configuration. The gooseneck trailer hitch assembly comprises a base mount configured to mount on a trailer, a stanchion structure extending upwardly from the base mount, and a boom structure mounted on the stanchion structure above the base mount. The boom structure is movable between a tow configuration in which the boom structure functions as a gooseneck for a hitch and a boom configuration in which the boom structure functions as a lifting boom. A trailer system includes a trailer and a gooseneck trailer hitch assembly convertible between a tow configuration and a boom configuration mounted on the trailer.

20 Claims, 4 Drawing Sheets

GOOSENECK TRAILER HITCH CONVERTIBLE TO A LIFTING BOOM

BACKGROUND

1. Field

The present disclosure relates to trailer hitches and more particularly pertains to a new gooseneck trailer hitch convertible to a lifting boom for use as a hitch and as a lifting boom for a trailer.

2. Description of the Prior Art

The use of trailer hitches is known for the purpose of connecting a trailer to a towing vehicle so that the towing vehicle is able to tow the trailer.

SUMMARY

In view of the foregoing disadvantages inherent in the known types of trailer hitches now present in the prior art, the present disclosure describes a new gooseneck trailer hitch convertible to a lifting boom which may be utilized as a hitch and as a lifting boom for a trailer.

In one aspect, the present disclosure relates to a gooseneck trailer hitch assembly that is convertible to a lifting boom as the gooseneck assembly is convertible between a tow configuration and a boom configuration. The gooseneck trailer hitch assembly comprises a base mount configured to mount on a trailer, a stanchion structure extending upwardly from the base mount, and a boom structure mounted on the stanchion structure above the base mount. The boom structure is movable between a tow configuration in which the boom structure functions as a gooseneck for a hitch and a boom configuration in which the boom structure functions as a lifting boom.

In another aspect, the disclosure relates to a trailer system with a gooseneck trailer hitch assembly convertible to a lifting boom. The trailer system comprises a trailer having a bed portion and a tongue portion, and a gooseneck trailer hitch assembly convertible between a tow configuration and a boom configuration. The gooseneck trailer hitch assembly comprises a base mount mounted on the tongue portion of the trailer, a stanchion structure extending upwardly from the base mount, and a boom structure mounted on the stanchion structure above the base mount. The boom structure is movable between a tow configuration in which the boom structure functions as a gooseneck for a hitch and a boom configuration in which the boom structure functions as a lifting boom.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3 also shows a modification of the tongue of the trailer that permits the apex portion of the tongue to be removed, or tilted upwardly or downwardly.

FIG. 4 also show the variation of the tongue that is shown in FIG. 3 of the drawings.

DETAILED DESCRIPTION

Figure 1:
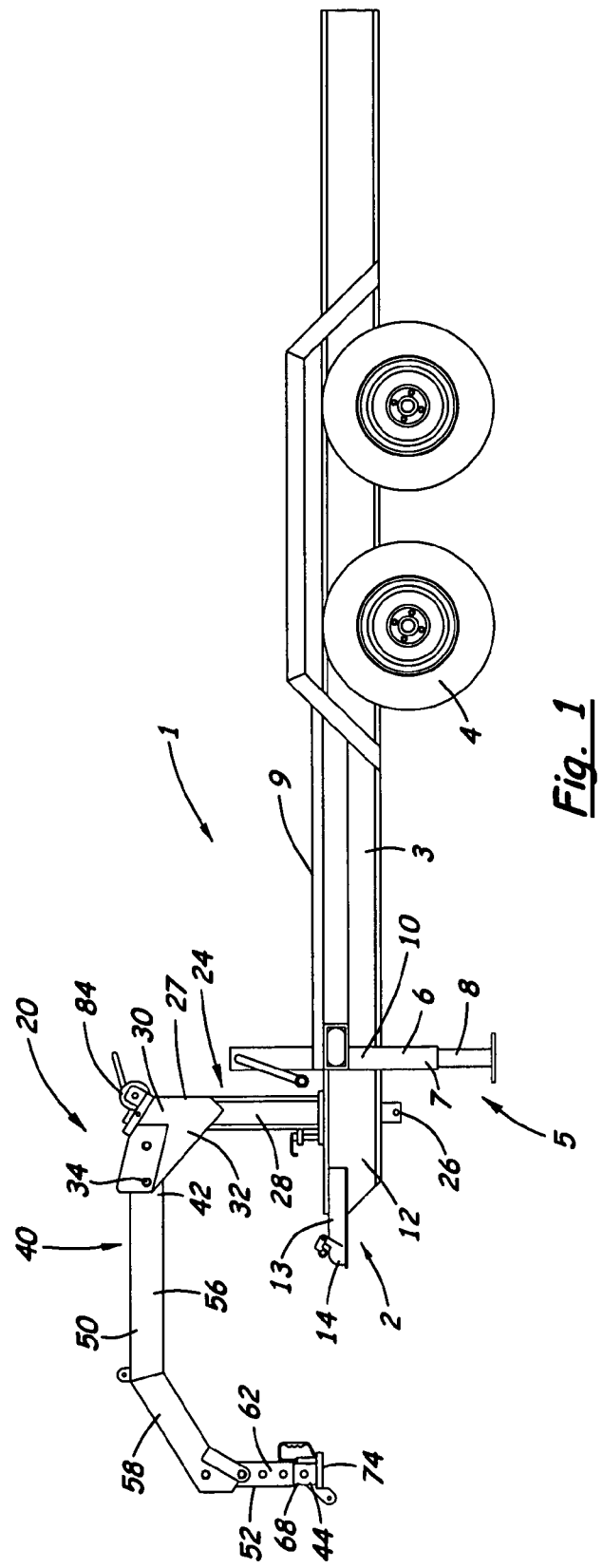
FIG. 1 is a schematic side view of a new gooseneck trailer hitch convertible to a lifting boom according to the present disclosure mounted on a trailer, showing the boom structure in a full tow configuration with the first boom assembly in the tow position and the second boom assembly in the tow position.
Figure 2:
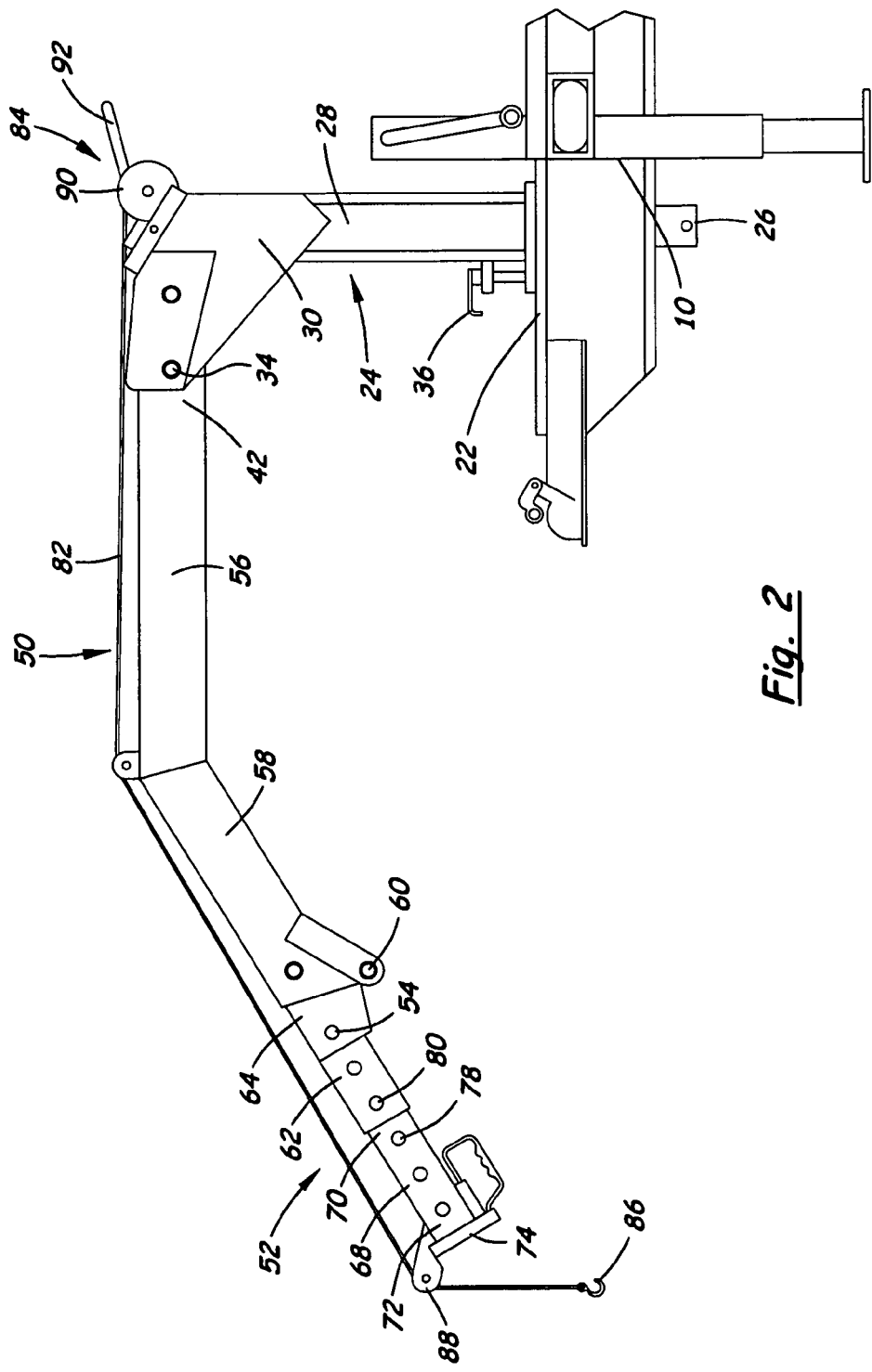
FIG. 2 is a schematic side view of the gooseneck convertible trailer hitch, according to an illustrative embodiment, showing the boom structure with the first boom assembly shown in the tow position and the second boom assembly shown in the boom position.

With reference now to the drawings, and in particular to FIGS. 1 through 4 thereof, a new gooseneck trailer hitch convertible to a lifting boom embodying the principles and concepts of the disclosed subject matter will be described.

The convertible gooseneck assembly 20 of this disclosure is highly suitable for implementation on a trailer 1 that is towable behind a vehicle. The trailer 1 may have a front 2 and a rear, and may comprise a frame 3, an axle mounted on the frame, and wheels 4 mounted on the axle to support the axle and frame above the ground surface.

A stabilizing assembly 5 may be mounted on the trailer 1, and on the frame 3, to support the frame on the ground surface along with the wheels. The stabilizing assembly 5 may support the front 2 of the trailer 1 when the trailer is not hitched to a vehicle, or may help to stabilize the trailer when the convertible gooseneck assembly 20 is being used to lift items the weight of which might affect the balance or stability of the trailer. The stabilizing assembly 5 may be mounted on the frame 3 toward the front 2 of the trailer. The stabilizing assembly 5 may comprise at least one stabilizer 6, and preferably but not critically includes a pair of the stabilizers. Illustratively, each of the stabilizers 6 may be mounted on a forward corner of the frame 3. Each of the stabilizers may comprise a stationary member 7 that is mounted on the frame 3 and a movable member 8 that is extendable and retractable with respect to the stationary member. The movable member 8 is movable in a downward direction to contact the ground surface and is retractable to be removed from the ground surface, such as when the trailer is to be moved. The stationary member 7 may form a cavity that opens downwardly, and the movable member 8 may be movable in the cavity of the stationary member to permit extension and retraction. The movable member 8 may have a lower end with a pad for contacting the ground surface when the movable member is extended. The trailer 1 may also have a bed 9 that is mounted on the frame, and which may carry cargo that may be lifted and manipulated by the gooseneck assembly 20. The bed 9 may be of any suitable type, such as a completely flat bed, or a bed that includes sides, containers, etc.

The frame 3 may include a forward frame member 10 located toward the front of the bed 9, a first tongue frame member 11 that extends forwardly from the forward frame member 10, and a second tongue frame member 12 that also extends forwardly from the forward frame member. The first 11 and second 12 tongue frame members diverge toward the forward frame member 10 and converge forwardly of the forward frame member 10 at an apex 13. The forward frame member 10 and the first 11 and second 12 frame members may form a substantially triangular shape with a substantially triangular space therebetween. A bumper-pull hitch including a ball hitch receiver socket 14 may be mounted on the tongue of the frame, and may be located at the apex 13 of the tongue of the frame. Beneficially, the inclusion of the ball hitch receiver socket 14 in embodiments allows the trailer 1 to be pulled behind a vehicle that includes a ball mounted on the vehicle in the rear bumper area, and allows the vehicle to remain to be attached to the pulling vehicle when the gooseneck assembly 20 is being used as a lifting boom.

Figure 3:
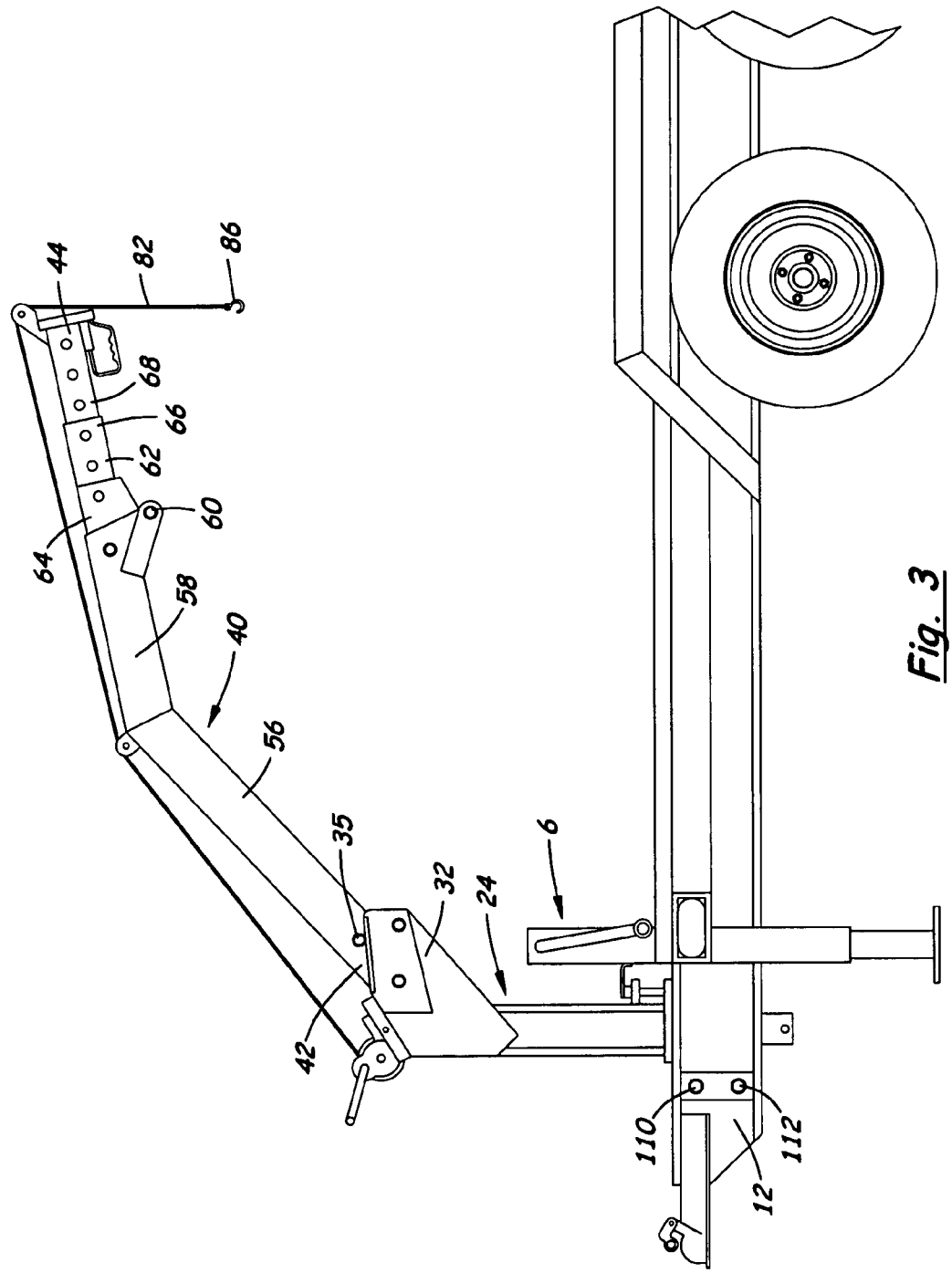
FIG. 3 is a schematic side view of the gooseneck convertible trailer hitch, according to an illustrative embodiment, showing the boom structure in a full boom configuration with the first boom assembly shown in the boom position and the second boom assembly shown in the boom position.
Figure 4:
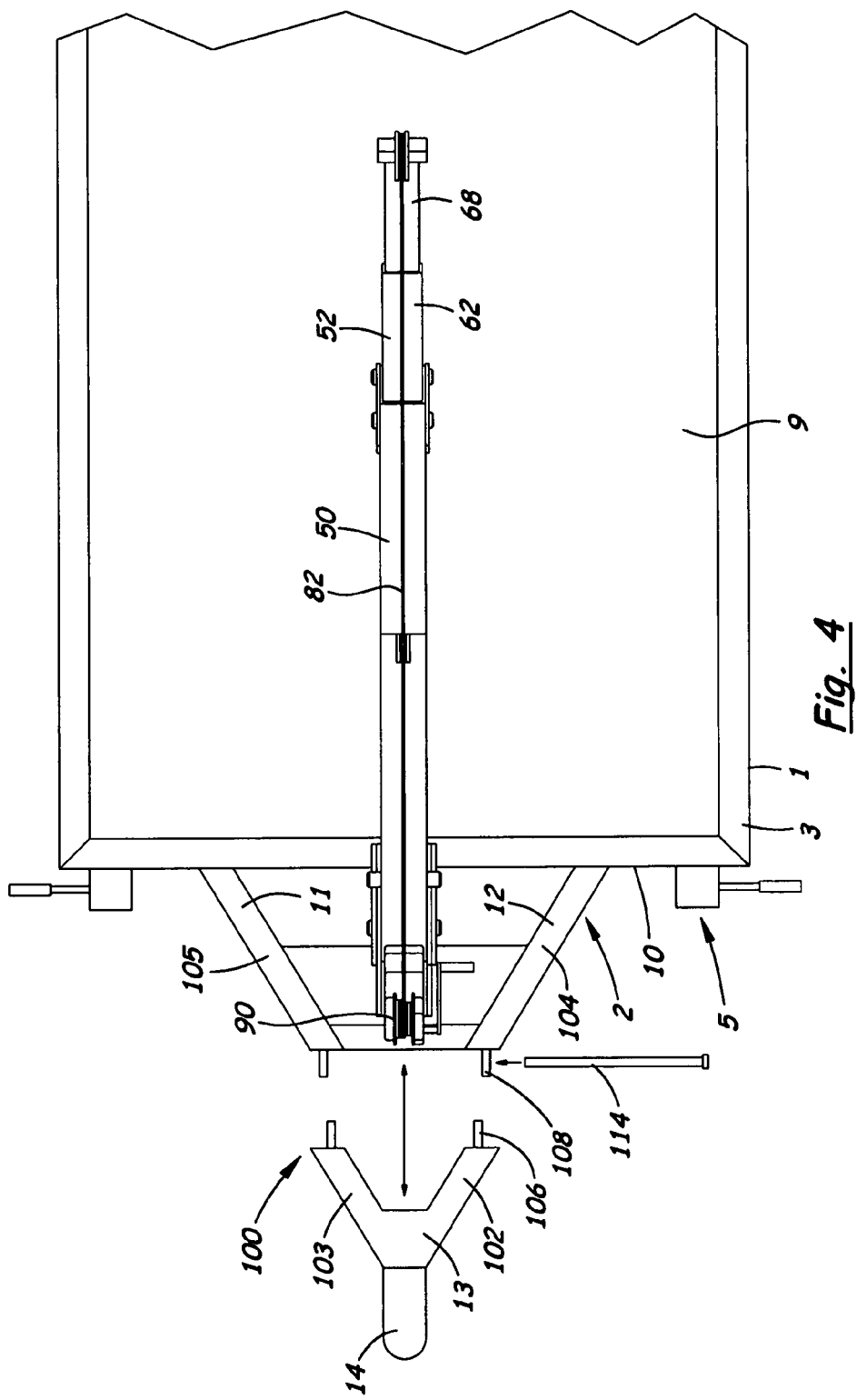
FIG. 4 is a schematic top view of the gooseneck convertible trailer hitch, according to an illustrative embodiment, showing the boom structure with the first boom assembly shown in the tow position and the second boom assembly shown in the boom position.

Optionally, the portion of the tongue that is located adjacent to the apex 13 (e.g., the forward portions of the tongue frame members and the bumper pull hitch) may be mounted on the remainder of the tongue (e.g., the rearward portions of the tongue frame members) to permit the apex portion to be pivoted upwardly, downwardly (or even be removed from the remainder portion of the tongue) out of the way as needed to shorten the extension of the tongue from the forward frame member, such as in some cases when the gooseneck assembly 20 is being used as a hitch. As shown in FIGS. 3 and 4, an optional tongue structure 100 providing this functionality may include forward sections 102, 103 and rearward sections 104, 105 of the tongue frame members 11, 12, and an ear 106 may extend rearwardly from each of the forward sections 11, 12, and another ear 108 may extend forwardly from each of the rearward sections 104, 105. The ears 106, 108 may each have an upper aperture 110 and a lower aperture 112 which are located above and below the other, and the upper apertures 110 of the ears are alignable with each other, and the lower apertures 112 are alignable with each other, so that a pin 114 may be inserted into each of the upper apertures and the lower apertures to secure the apex portion of the tongue to the remainder portion of the tongue. in a substantially immovable manner. Optionally, the top pin 114 may be removed from the upper apertures of the ears 106, 108 so that the apex portion of the tongue may tilt downwardly with respect to the remainder portion of the tongue. Conversely, if the upper pin is left in place in the upper apertures, but the lower pin 114 is removed from the lower apertures, then the apex portion may be pivoted upwardly with respect to the remainder portion. As a third option, the pins 114 from both the upper and lower apertures may be removed and the apex portion of the tongue may be removed from securement to the remainder portion. The apex portion may be replaced on the reminder portion be realigning the upper and lower apertures and reinserting the pins 114. Other structures or configurations may be employed to provide the removability or movement function, and are considered to be within the scope of the disclosure. For example, the structure may permit the apex portion of the tongue to pivot or swing sidewardly.

The convertible gooseneck assembly 20 is advantageously convertible between a tow configuration (see FIG. 1) and a boom configuration (see FIG. 3). The tow or hitch configuration may provide a fifth-wheel hitch coupling for the trailer 1 so that the trailer may be towed by a vehicle equipped with a fifth-wheel hitch. The boom configuration of the gooseneck assembly 20 provides the ability to lift and otherwise manipulate items on the bed 9 of the trailer, as well as items located beside the trailer and even on a towing vehicle located forwardly of the trailer.

The gooseneck assembly 20 may be mountable on the trailer, such as on the tongue of the trailer, although other positions may be employed, and may be at least partially positioned between the first 11 and second 12 tongue frame members of the frame, behind the apex 13 of the tongue. In greater detail, the gooseneck assembly may comprise a base mount 22 for mounting on the trailer, such as on the frame of the trailer or more specifically the tongue portion of the trailer 1. The base mount 22 may be positioned in the space of the tongue that is formed by the frame members 10, 11, and 12.

The gooseneck assembly 20 may further comprise a stanchion structure 24 that may be mounted on the base mount 22. The stanchion structure 24 may extend upwardly from the base mount 22, and may have a substantially vertical orientation. The stanchion structure 24 has a lower end 26 and an upper end 27, and the lower end 26 may be mounted on the base mount 22. The stanchion structure 24 may be rotatable with respect to the base mount 22, and may be rotatable about a substantially vertical axis. The stanchion structure 24 may comprise an upright member 28 that rotatably mounted on the base mount 22. The stanchion structure 24 may also comprise an upper mount 30 which may include a pair of spaced ears 32. At least one, and preferably both, of the ears 32 have an aperture 34 formed therethrough. The stanchion structure 24 may further comprise a locking assembly 36 that is configured to releasably lock the upright member 28 against rotation with respect to the base mount 22. The locking assembly 36 may be mounted on the upright member 28 and may selectively engage an aperture located in the base mount 22. For example, the locking assembly 36 may include a pin that is mounted on the upright member 28 and may be moved into the aperture on the base mount 22 that stops movement of the parts with respect to each other, and may be removed from the aperture to permit movement of the upright member 28 with respect to the base mount 22, such as rotational movement.

The gooseneck assembly 22 may also include a boom structure 40 mounted on the stanchion structure 24 above the base mount 22, and toward the upper end 27 of the stanchion structure. The boom structure 40 may have an inboard end 42 and an outboard end 44, with the inboard end being mounted on the stanchion structure 24. The boom structure 40 may be rotatable about a substantially vertical axis, such as by rotating with the stanchion structure 24. although other means of permitting rotation of the boom structure may be employed, such as having the boom structure rotate with respect to the stanchion structure. In some embodiment, the boom structure 40 may be rotated up to 360 degrees, although more limited ranges of rotation may be utilized.

The boom structure 40 may be pivotable about a substantially horizontal axis, and to provide this type of movement the boom structure may be pivotally mounted on the stanchion structure 24 such that the boom structure 40 pivots with respect to the stanchion structure. The boom structure 40 may be pivotable in a substantially vertical plane between a tow position (see FIG. 1) and a boom position (see FIG. 3). The tow position may be characterized by the boom structure 40 extending in a substantially horizontal orientation, and the boom position may be characterized by the boom structure extending in an orientation that is inclined in an upward from the inboard end 42 to the outboard end 44. It should be recognized that the boom structure may be utilized as a boom even when the boom structure is in the tow position, as the operation of the boom structure as a boom is not dependent upon the boom structure being in a particular orientation. The boom structure 40 may also include at least one channel 46 for receiving a pin 35, and when the channel is aligned with the aperture 34 formed in the ears 32, 33 and the pin is inserted, the boom structure 40 may be secured in at least one of the tow and boom positions. The position may be the tow position, and the channel 46 may be positioned such that insertion of a pin into the at least one channel holds the boom assembly against movement into the tow position.

The boom structure 40 may comprise a first boom assembly 50 and a second boom assembly 52. The first boom assembly 50 is positioned toward the inboard end 42 of the boom structure, and the second boom assembly 52 is located toward the outboard end of the boom structure. The first boom assembly 50 may be pivotable between a tow position (see FIGS. 1 and 2) and a boom position (see FIG. 3), and the pivoting between the positions may occur about a substantially horizontal axis.

The first boom assembly 50 may include an inner boom section 56 located toward the inboard end 42 of the boom structure, and an outer boom section 58 located toward the outboard end 44 of the boom structure. A longitudinal axis of the outer boom section 58 may be angled with respect to a longitudinal axis of the inner boom section 56 at a non-zero angle, and may be angled downwardly from the longitudinal axis of the inner boom section. The angle may measure less than approximately 45 degrees, and may range between approximately 10 degrees and 35 degrees. The inner and outer boom sections 56, 58 may be fixed in position with respect to each other, as is depicted in the illustrative embodiment, or may permit some degree of movement between the inner and outer boom sections. The outer end portion of the outer boom section 58 may have at least one boom aperture 60 for receiving a pin. The outer end portion of the outer boom section 58 may also form a pair of ears between which a portion of the second boom assembly 52 is positioned.

The second boom assembly 52 is mounted on the first boom assembly 50, and may be pivotally mounted on the first boom assembly so as to be pivotable with respect to the first boom assembly in a substantially vertical plane. The second boom assembly 52 may be pivotable between a tow position (see FIG. 1) and a boom position (see FIGS. 2 and 3), and the pivoting between the positions may occur about a substantially horizontal axis. The second boom assembly 52 may be substantially vertically oriented in the tow position (see FIG. 1) and may be substantially horizontally oriented in the lift position (see FIGS. 2 and 3), although these orientations may not be precisely true in all embodiments, and depend to some degree upon the orientation of the first boom assembly. The second boom assembly 52 may have a positioning hole 54 for receiving a pin, and the hole 54 may be alignable with the boom aperture 60 when the second boom assembly is in the tow position. The positioning hole 54 may be positioned such that insertion of a pin into the positioning hole 54 when the second boom assembly is in the tow position blocks the second boom assembly from moving from the tow position to the boom position, although the positioning or the hole and the restriction of movement may vary.

The second boom assembly 52 may comprise a first boom segment 62 mounted on the first boom assembly 50, and a second boom segment 68 mounted on the first boom segment. The first boom segment has a first end 64 which may be mounted on the first boom assembly 50. The first boom segment 62 also has a second end 66, and the second boom segment may define a cavity therein with an opening into the cavity located at the second end 66. The second boom segment 68 may be extendable and retractable with respect to the first boom segment, although this function is not critical. The second boom segment 68 may have a first end 70 which may be positioned or mounted in the cavity in the first boom segment 72. The degree to which the second boom segment 68 is inserted into the first boom segment 62 may be adjustable to adjust the effective length of the second boom assembly 52, which is useful to adjusting the gooseneck assembly in the tow configuration to different fifth-wheel hitch heights, and which is also useful for adjusting the effective reach of the boom structure 40 when the boom structure is in the boom configuration.

The second boom segment 68 also has a second end 72, and a fifth-wheel hitch assembly 74 may be located on the second end that is configured to removably engage a fifth-wheel hitch pin on a towing vehicle. The fifth-wheel hitch assembly 74 may be of any suitable type known and available for the purpose of engaging a hitch ball, and may include a releasable locking structure to lock the assembly 74 on the hitch ball of the towing vehicle.

A securing structure 76 may be included on the second boom assembly 52 for securing the extended or retracted position of the second boom segment 68 with respect to the first boom segment 50. The securing structure 76 may comprise a plurality of adjustment holes 78 in one of the boom segments 62, 68 and at least one hole 80 in the other of the boom segments 62, 68. The at least one hole 80 is selectively alignable with the adjustment holes 78 such that the hole 80 and one of the adjustment holes 78 for receiving a pin to secure the position of the boom segments 62, 68 with respect to each other.

The convertible gooseneck assembly 20 may also include a cable 82 mounted on the boom structure 40 for engaging and lifting items, and a cable movement assembly 84 for moving the cable with respect to the boom structure 40. The cable 82 may have a hook 86 mounted on one of the ends of the cable. One or more cable guides 88 may be mounted on the boom structure 40 for guiding the cable along at least a portion of the boom structure. The cable movement assembly 84 may include a reel 90 for receiving and paying out a portion of the cable, and the reel may be located at various locations on the stanchion structure 24 or on the boom structure 40 (or even off of the stanchion and boom structure). In the illustrative embodiment, the reel 90 is mounted on the upper mount 30 of the stanchion structure 24. The reel 90 may be manually rotated using a crank 92 for rotating the reel. Optionally, the reel may be rotated by a motor driven, for example, by electricity or hydraulics.

Rotating of the reel 90 causes the cable 82, and the hook 86 on the cable, to retract and extend with respect to the boom structure. Optionally, retraction and extension of the cable 82 may be used to raise and lower the boom structure 40 with respect to the stanchion structure 24. The cable guide 88 may be configured so that the hook is not able to move through the cable guide, or the hook 86 is able to hook onto the cable guide, so that retraction of the cable by the reel pulls on the outboard end of the boom structure 40, which can have the result of pivoting the first 50 and the second 52 boom assemblies back toward the stanchion structure, and so that controlled extension of the cable 82 can allow gravity to pivot the boom assemblies 50, 52 downwardly. These movements can assist in moving the boom structure between the tow and boom configurations when one or more of the various locking pins are removed.

Optionally, various attachments may be employed that removably attach to the outboard end 44 of the boom structure and provide functions other than simply a cable lifting device. For example, an aerial basket may be removably mounted on the outboard end 44, as well as work platform, and even an additional boom section to extend the reach of the boom structure. Suitable mounting structures are known to those skilled in the art.

It should be recognized that the boom structure 40 may be configured in various combinations of the tow and boom positions of the first boom assembly 50 and the tow and boom positions of the second boom assembly 52. Further, the boom structure 40, the first boom assembly 50 and the second boom assembly 52 may have more positions than those positions described herein.

The convertible gooseneck assembly 20 may be integrated with a trailer at the time of the manufacture of the trailer, or may be added as a retrofit at a time after the original manufacture of the trailer. The configuration of the tongue frame members 11, 12 that define the space therebetween is a feature of many trailers, which makes those trailers suitable for the installation of the convertible gooseneck assembly 20.

The convertible gooseneck assembly 20 may provide a trailer with two separate means for hitching to a towing vehicle where the trailer incorporates a bumper-pull hitch ball receiver, as the gooseneck assembly 20 not only acts as a lifting boom, but also as a gooseneck for a fifth-wheel type hitch ball receiver.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A gooseneck trailer hitch assembly convertible to a lifting boom, the gooseneck assembly being convertible between a tow configuration and a boom configuration, the gooseneck trailer hitch assembly comprising:
    a base mount configured to mount on a trailer;
    a stanchion structure extending upwardly from the base mount;
    a boom structure mounted on the stanchion structure above the base mount;
    wherein the boom structure is movable between a tow configuration in which the boom structure functions as a gooseneck for a hitch and a boom configuration in which the boom structure functions as a lifting boom.

2. The assembly of claim 1 additionally comprising a fifth-wheel hitch assembly configured to removably engage a fifth-wheel hitch pin, the fifth-wheel hitch assembly being mounted on an outboard end of the boom structure.

3. The assembly of claim 1 wherein the boom structure is pivotable in a substantially vertical plane.

4. The assembly of claim 3 wherein the boom structure is rotatable about a substantially vertical axis.

5. The assembly of claim 4 wherein the stanchion structure is rotatable about a substantially vertical axis.

6. The assembly of claim 1 wherein the boom structure is pivotally mounted on the stanchion structure such that the boom structure pivots about a substantially horizontal axis.

7. The assembly of claim 1 wherein the boom structure has an inboard end and an outboard end, the boom structure comprising:
    a first boom assembly positioned toward the inboard end of the boom structure; and
    a second boom assembly positioned toward the outboard end of the boom structure.

8. The assembly of claim 1 wherein the first boom assembly is pivotably movable between a tow position and a boom position.

9. The assembly of claim 8 wherein the first boom assembly is the substantially horizontally oriented in the tow position and the first boom assembly is inclined upwardly from the inboard end toward the outboard end in the boom position.

10. The assembly of claim 7 wherein the first boom assembly comprises:
    an inner boom section located toward the inboard end of the boom structure; and
    an outer boom section connected to the inner boom section and located toward the outboard end of the boom structure.

11. The assembly of claim 10 wherein a longitudinal axis of the outer boom section is angled at a non-zero angle with respect to a longitudinal axis of the inner boom section.

12. The assembly of claim 11 wherein the longitudinal axis of the outer boom section is angled downwardly from the longitudinal axis of the inner boom section.

13. The assembly of claim 7 wherein the second boom assembly is pivotable with respect to the first boom assembly, the second boom assembly being pivotable between a tow position and a boom position.

14. The assembly of claim 11 wherein the second boom assembly is substantially vertically oriented in the tow position and the second boom assembly being substantially horizontally oriented in the boom position.

15. The assembly of claim 1 wherein the second boom assembly is pivotable about a substantially horizontal axis with respect to the first boom assembly.

16. The assembly of claim 1 wherein the second boom assembly comprises:
    a first boom segment mounted on the first boom assembly; and
    a second boom segment mounted on the first boom segment, the second boom segment being extendable and retractable with respect to the first boom segment.

17. The assembly of claim 1 additionally comprising a cable mounted on the boom structure and a cable movement assembly configured to move the cable with respect to the boom structure.

18. The assembly of claim 1 additionally comprising a fifth-wheel hitch assembly configured to removably engage a fifth-wheel hitch pin, the fifth-wheel hitch assembly being mounted on an outboard end of the boom structure;
- wherein the boom structure is pivotable in a substantially vertical plane;
- wherein the boom structure is rotatable about a substantially vertical axis;
- wherein the stanchion structure is rotatable about a substantially vertical axis;
- wherein the boom structure is pivotally mounted on the stanchion structure such that the boom structure pivots about a substantially horizontal axis;
- wherein the boom structure has an inboard end and an outboard end, the boom structure comprising:
  - a first boom assembly positioned toward the inboard end of the boom structure; and
  - a second boom assembly positioned toward the outboard end of the boom structure;
- wherein the first boom assembly is pivotably movable between a tow position and a boom position;
- wherein the first boom assembly is the substantially horizontally oriented in the tow position and the first boom assembly is inclined upwardly from the inboard end toward the outboard end in the boom position;
- wherein the first boom assembly comprises:
  - an inner boom section located toward the inboard end of the boom structure; and
  - an outer boom section connected to the inner boom section and located toward the outboard end of the boom structure;
- wherein a longitudinal axis of the outer boom section is angled at a non-zero angle with respect to a longitudinal axis of the inner boom section;
- wherein the longitudinal axis of the outer boom section is angled downwardly from the longitudinal axis of the inner boom section;
- wherein the second boom assembly is pivotable with respect to the first boom assembly, the second boom assembly being pivotable between a tow position and a boom position;
- wherein the second boom assembly is substantially vertically oriented in the tow position and the second boom assembly being substantially horizontally oriented in the boom position;
- wherein the second boom assembly is pivotable about a substantially horizontal axis with respect to the first boom assembly;
- wherein the second boom assembly comprises:
  - a first boom segment mounted on the first boom assembly; and
  - a second boom segment mounted on the first boom segment, the second boom segment being extendable and retractable with respect to the first boom segment; and
- a cable mounted on the boom structure and a cable movement assembly configured to move the cable with respect to the boom structure.

19. A trailer system with a gooseneck trailer hitch assembly convertible to a lifting boom, the trailer system comprising:
   - a trailer having a bed portion and a tongue portion; and
   - a gooseneck trailer hitch assembly convertible between a tow configuration in which the hitch assembly functions as a hitch for the trailer and a boom configuration in which the hitch assembly functions as a lifting boom, the gooseneck trailer hitch assembly comprising:
     - a base mount mounted on the tongue portion of the trailer;
     - a stanchion structure extending upwardly from the base mount;
     - a boom structure mounted on the stanchion structure above the base mount;
     - wherein the boom structure is movable between a tow configuration in which the boom structure functions as a gooseneck for a hitch and a boom configuration in which the boom structure functions as a lifting boom.

20. The trailer system of claim 19 wherein the tongue portion of the trailer includes an apex section and a remainder section;
   - wherein the trailer includes a bumper-pull hitch mounted on an apex section of the tongue portion of the trailer; and
   - wherein the apex section of the tongue portion is pivotable with respect to the remainder section of the tongue portion to minimize a forward protrusion distance of the tongue portion from the bed portion of the trailer.

* * * * *